US012063413B2

(12) United States Patent
Zhong et al.

(10) Patent No.: US 12,063,413 B2
(45) Date of Patent: Aug. 13, 2024

(54) DEVICE AND SYSTEM FOR STREAMING MEDIA INTERACTION

(71) Applicant: Telefonaktiebolaget LM Ericsson (publ), Stockholm (SE)

(72) Inventors: Bo Zhong, Beijing (CN); Yanping Dang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 254 days.

(21) Appl. No.: 17/600,166

(22) PCT Filed: Nov. 29, 2019

(86) PCT No.: PCT/CN2019/122045
§ 371 (c)(1),
(2) Date: Sep. 30, 2021

(87) PCT Pub. No.: WO2020/199627
PCT Pub. Date: Oct. 8, 2020

(65) Prior Publication Data
US 2022/0182713 A1 Jun. 9, 2022

(30) Foreign Application Priority Data
Apr. 4, 2019 (CN) .......................... 201920460340.0

(51) Int. Cl.
*H04N 21/4363* (2011.01)
*H04N 21/414* (2011.01)
*H04N 21/478* (2011.01)

(52) U.S. Cl.
CPC . *H04N 21/43637* (2013.01); *H04N 21/41407* (2013.01); *H04N 21/4781* (2013.01)

(58) Field of Classification Search
CPC ......... H04N 21/4122; H04N 21/41407; H04N 21/4333; H04N 21/43635;
(Continued)

(56) References Cited

U.S. PATENT DOCUMENTS 10,812,549 B1 * 10/2020 Iskandar ............ H04N 21/8173
2009/0118019 A1 * 5/2009 Perlman ................ A63F 13/533
463/42
(Continued)

FOREIGN PATENT DOCUMENTS

CN 209692952 U 11/2019
EP 2648118 A2 10/2013
(Continued)

OTHER PUBLICATIONS

Admin, Chromecast Generations and Variations Comparison, Jul. 14, 2019, Cool Tech Trends, new gadgets info and reviews, p. 7-8 (Year: 2019).*
(Continued)

*Primary Examiner* — Rong Le
(74) *Attorney, Agent, or Firm* — Rothwell, Figg, Ernst & Manbeck, P.C.

(57) ABSTRACT

The embodiments of the present disclosure provide a device and system for streaming media interaction. The device includes: a short range communication module; a wireless communication module configured to be capable of communicating with a remote server, a processor communicatively connected to the short range communication module and the wireless communication module; a memory having stored therein instructions which, when executed by the processor, enable the processor to: transmit, through the wireless communication module, a control input which is received through the short range communication module; receive a media stream responsive to the control input through the wireless communication module; and output the media stream to an external apparatus.

18 Claims, 4 Drawing Sheets

(58) Field of Classification Search
CPC ....... H04N 21/43637; H04N 21/44231; H04N 21/4781; H04N 21/6131
See application file for complete search history.

(56) References Cited

U.S. PATENT DOCUMENTS

| | | | | |
|---|---|---|---|---|
| 2011/0292824 | A1* | 12/2011 | Uemura | H04B 7/2678 370/252 |
| 2014/0221087 | A1* | 8/2014 | Huang | A63F 13/335 463/31 |
| 2015/0382057 | A1* | 12/2015 | Huang | H04N 21/2543 725/14 |
| 2018/0139508 | A1* | 5/2018 | Norin | H04N 7/20 |
| 2018/0376218 | A1* | 12/2018 | Wu | H04N 21/4183 |
| 2020/0221157 | A1* | 7/2020 | Black | H04N 21/42221 |

FOREIGN PATENT DOCUMENTS

| | | |
|---|---|---|
| GB | 2477151 A | 7/2011 |
| WO | 2013151397 A1 | 10/2013 |
| WO | 2014085714 A1 | 6/2014 |
| WO | 2015017541 A1 | 2/2015 |

OTHER PUBLICATIONS

International Search Report and the Written Opinion of the International Searching Authority, issued in corresponding International Application No. PCT/CN2019/122045, dated Feb. 17, 2020, 10 pages.

* cited by examiner

DEVICE AND SYSTEM FOR STREAMING MEDIA INTERACTION

CROSS REFERENCE TO RELATED APPLICATION(S)

This application is a 35 U.S.C. § 371 National Phase Entry Application from PCT/CN2019/122045, filed Nov. 29, 2019, designating the United States, and also claims the benefit of Chinese Application No. 201920460340.0, filed Apr. 4, 2019, the disclosures of which are incorporated herein by reference in their entirety.

TECHNICAL FIELD

The present disclosure relates to the field of network technology, and more particularly, to a device and system for streaming media interaction.

BACKGROUND

With the popularity of mobile terminals and the development of network communication technology, the use of mobile terminal devices for gaming has become a fairly common entertainment activity. However, due to the limitation of screen sizes of the mobile terminals, the mobile terminals (for example, a common smartphone with a size of about 5 inches or 6 inches or a larger tablet with a size of about 10 inches) usually have small display pictures and do not have a dedicated controller (for example, do not have a game pad, but only have a display to be directly touched), which results in poor users' gaming experience. In addition, due to the limitation of mobile characteristics of the mobile terminals, a balance between performance and power saving also needs to be considered for hardware installed thereon (for example, a central processing unit, a memory, an image processor, a battery, etc.), and thus large-scale games, such as the "Call of Duty" series, the "Tomb Raider" series, the "Battlefield" series etc. may not be run smoothly. Further, operations such as receiving incoming calls and message notifications etc. affect the running of the games, and the running of the games is also not conducive to operations such as receiving calls, making calls etc. That is, the running of the games and the other operations of the mobile terminals are mutually exclusive and mutually influential. In order to enable high-quality/large-scale games to be run smoothly, a large-sized desktop computer is usually required, which in turn causes problems that the computer is not easy to carry, the games may not be run anytime and anywhere etc.

SUMMARY

In order to solve or at least partially alleviate the above problems, there are proposed a device, method and system for streaming media interaction according to an embodiment of the present disclosure.

According to an aspect of the present disclosure, there is proposed a device for streaming media interaction. The device comprises: a short range communication module; a wireless communication module configured to be capable of communicating with a remote server; a processor communicatively connected to the short range communication module and the wireless communication module; a memory having stored therein instructions which, when executed by the processor, enable the processor to: transmit, through the wireless communication module, a control input which is received through the short range communication module; receive a media stream responsive to the control input through the wireless communication module; and output the media stream to an external apparatus.

In some embodiments, the wireless communication module is configured to support a wireless communication protocol which implements end-to-end Quality of Service (QoS) guarantee. In some embodiments, the received media stream is generated in real time in response to the control input. In some embodiments, the wireless communication module is a communication module which supports the 5th Generation (5G) wireless communication protocol or subsequent wireless communication protocols released by a 3rd Generation Partnership Project (3GPP) organization. In some embodiments, a response delay of the received media stream relative to the control input is less than or equal to 50 milliseconds. In some embodiments, the received media stream is an encoded media stream. In some embodiments, the device further comprises a decoder communicatively connected to the processor, wherein the instructions, when executed by the processor, further enable the processor to: instruct the decoder to decode the encoded media stream; and output the decoded media stream to the external apparatus.

In some embodiments, the device further comprises: a media stream output interface communicatively connected to the processor and configured to be able to output a video stream in the media stream to the external apparatus under control of the processor. In some embodiments, the instructions, when executed by the processor, further enable the processor to: output an audio stream in the media stream to an external audio apparatus through the media stream output interface and/or the short range communication module. In some embodiments, the media stream output interface is a High Definition Multimedia Interface (HDMI) or a Universal Serial Bus (USB) interface. In some embodiments, the device is powered through the media stream output interface. In some embodiments, the device has a length less than or equal to 18 cm, a width less than or equal to 7 cm, and a thickness less than or equal to 4 cm. In some embodiments, the short range communication module is at least one of a Bluetooth communication module, a WiFi communication module, a ZigBee communication module, and a Z-Wave communication module. In some embodiments, the instructions, when executed by the processor, further enable the processor to: determine whether no control input is received through the short range communication module within a predetermined time period; and in response to determining that no control input is received through the short range communication module within the predetermined period of time, transmit an instruction for instructing to pause the media stream through the wireless communication module. In some embodiments, the instructions, when executed by the processor, further enable the processor to: output a media stream indicating that the media stream is paused to the external apparatus. In some embodiments, the instructions, when executed by the processor, further enable the processor to: receive, through the short range communication module, a control input for instructing to resume the media stream in a state in which the receiving of the media stream is paused; and transmit an instruction for instructing to resume the media stream through the wireless communication module. In some embodiments, the instructions, when executed by the processor, further enable the processor to: output a media stream indicating that the media stream is resumed to the external apparatus. In some embodiments, the instructions, when executed by the processor, further enable the processor to: transmit an authentication message for authenticating the device through the wireless communication module; and receive an authentication result responsive to the authentication message through the wireless communication module.

Further, another aspect of the present disclosure proposes a system for streaming media interaction. The system comprises: one or more devices described above; and a server communicatively connected to the devices and configured to: receive a control input from a first one of the one or more devices; generate a media stream based on the control input and a first application which is executed in association with the first device; and transmit the generated media stream to the first device.

In some embodiments, a time delay between a time point when the control input is received and a time point when the generated media stream is transmitted is less than or equal to 50 milliseconds. In some embodiments, the server is further configured to: detect a connection state of a communication link with the first device; store application execution data associated with the first device in response to detecting that no data is received from the first device within a predetermined time period; and release resources allocated to the first device. In some embodiments, the server is further configured to: receive a connection request from the first device; determine whether last execution of application associated with the first device ends normally; read application execution data associated with the first device which is stored previously in response to determining that the last execution of application associated with the first device ends abnormally; resume the generation of the media stream based on the application execution data; and transmit the generated media stream to the first device.

Yet another aspect of the present disclosure proposes a computer-implemented method for streaming media interaction. The method comprises: transmitting, through a wireless communication module, a control input which is received through a short range communication module; receiving a media stream which is generated in response to the control input through the wireless communication module; and outputting the media stream to an external apparatus, wherein the wireless communication module supports a wireless communication protocol which implements end-to-end Quality of Service (QoS) guarantee. In some embodiments, the wireless communication protocol is the 5th Generation (5G) wireless communication protocol or a subsequent wireless communication protocol released by a 3rd Generation Partnership Project (3GPP) organization. In some embodiments, a response delay of the received media stream relative to the control input is less than or equal to 50 milliseconds. In some embodiments, the received media stream is an encoded media stream. In some embodiments, the method further comprises: decoding the encoded media stream; and outputting the decoded media stream to the external apparatus.

In some embodiments, the media stream comprises a video stream and/or an audio stream. In some embodiments, the short range communication module supports one of the following communication protocols: a Bluetooth communication protocol, a WiFi communication protocol, a ZigBee communication protocol and a Z-Wave communication protocol. In some embodiments, the method further comprises: determining whether no control input is received through the short range communication module within a predetermined time period; and in response to determining that no control input is received through the short range communication module within the predetermined period of time, transmitting an instruction for instructing to pause the media stream through the wireless communication module. In some embodiments, the method further comprises: outputting a media stream indicating that the media stream is paused to the external apparatus. In some embodiments, the method further comprises: receiving, through the short range communication module, a control input for instructing to resume the media stream in a state in which the receiving of the media stream is paused; and transmitting an instruction for instructing to resume the media stream through the wireless communication module. In some embodiments, the method further comprises: outputting a media stream indicating that the media stream is resumed to the external apparatus. In some embodiments, the method further comprises: transmitting an authentication message for authenticating the device through the wireless communication module; and receiving an authentication result responsive to the authentication message through the wireless communication module.

Further, according to a further aspect of the present disclosure, there is proposed a non-transitory computer readable storage medium having stored therein instructions which, when executed by a processor, cause the processor to perform the method described above.

With the device, method and/or system for streaming media interaction according to the embodiments of the present disclosure, the device and system have small sizes, and are portable and easy to use. Further, a user may be provided with streaming media interactive experience with a beautiful picture and a real-time response while avoiding the requirements for a bulky and non-portable desktop computer and installation and/or setup of corresponding software, and a previous progress of a game may be resumed anytime and anywhere, so that the user may enjoy the ultimate gaming experience more conveniently and quickly. In addition, users' use of mobile terminals is not affected.

BRIEF DESCRIPTION OF THE ACCOMPANYING DRAWINGS

In order to more clearly illustrate the technical solutions in the embodiments of the present disclosure, the accompanying drawings required to be used in the description of the embodiments will be briefly described below. It is obvious that the accompanying drawings in the following description are only some embodiments of the present disclosure. Other accompanying drawings may also be obtained by those of ordinary skill in the art according to these accompanying drawings without any creative work.

DETAILED DESCRIPTION

Figure 1:
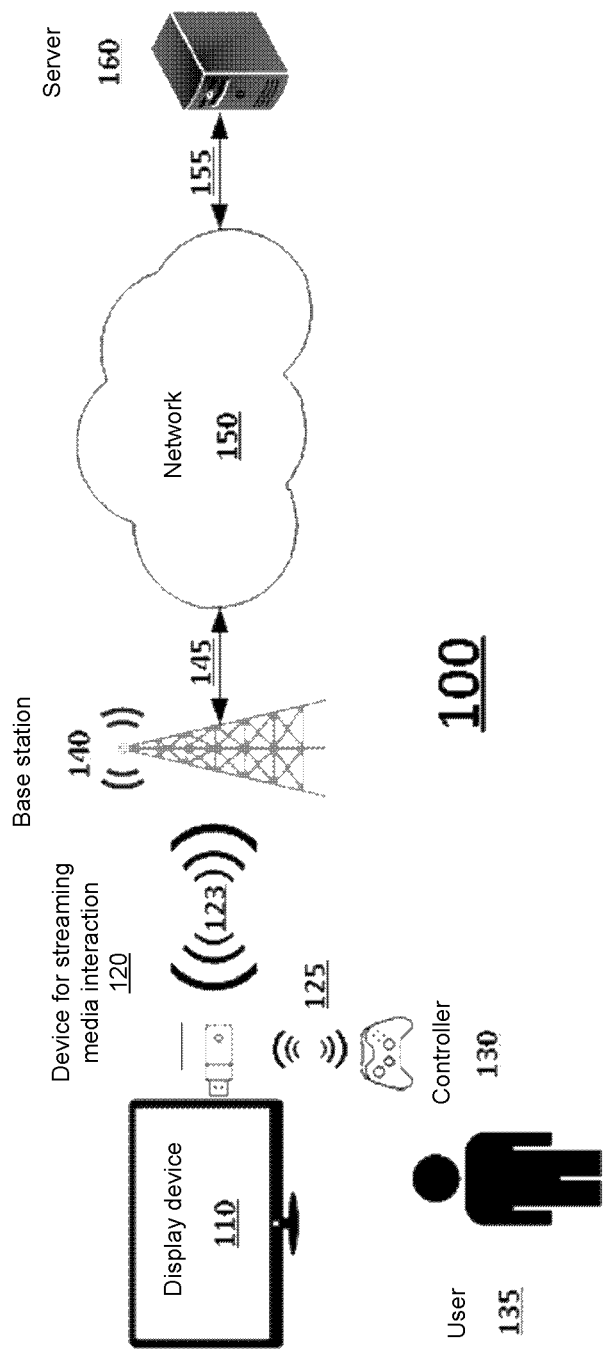
FIG. 1 is a diagram illustrating an exemplary application scenario in which a device for streaming media interaction and a system comprising the device for streaming media interaction according to an embodiment of the present disclosure may be applied.

Some of the embodiments of the present disclosure will be described in detail below with reference to the accompanying drawings, and details and functions which are not necessary for the present disclosure are omitted in the description to avoid confusing the understanding of the present disclosure. In the present specification, the following various embodiments for describing the principles of the present disclosure are merely illustrative and should not be construed as limiting the scope of the present disclosure in any way. The following description with reference to the accompanying drawings is intended to facilitate comprehensively understanding the exemplary embodiments of the present disclosure which are defined by the claims and equivalents thereof. The following description comprises numerous specific details to assist the understanding, but these details should be considered as merely exemplary. Therefore, it will be appreciated by those of ordinary skill in the art that various changes and modifications may be made to the embodiments described herein without departing from the scope and spirit of the present disclosure. In addition, descriptions of well-known functions and structures are omitted for clarity and conciseness. In addition, the same reference signs are used throughout the accompanying drawings for the same or similar functions, devices and/or operations. In addition, in the accompanying drawings, various parts are not necessarily drawn to scale. In other words, relative sizes, lengths etc. of the respective parts in the accompanying drawings do not necessarily correspond to actual ratios. In addition, all or a part of the features described in some embodiments of the present disclosure may also be applied to other embodiments to form new embodiments which still fall within the scope of the present application.

In addition, although the description is made in detail hereinafter by mainly taking the $5^{th}$ generation (5G) communication protocol released by a $3^{rd}$ Generation Partnership Project (3GPP) organization, the present disclosure is not limited thereto, and any high data rate communication protocol which supports QoS guarantee may be used, for example, subsequent communication protocols of the 5G communication protocol, or wired communication protocols (such as IEEE 802.1p/802.1Q or Multi-Protocol Label Switching (MPLS)) etc. Further, different devices described below may use the same communication protocol or different communication protocols. In addition, the present disclosure is not limited to a specific operating system of a device (for example, a device for streaming media interaction hereinafter), and may comprise, but not limited to, iOS, Windows Phone, Symbian, Android, Linux, Unix, Windows, MacOS, etc., and different devices may use the same operating system or different operating systems.

In the present disclosure, the terms "comprise" and "comprising" and their derivatives are meant to be inclusive and not limiting; the term "or" is inclusive, meaning and/or. In addition, in the following description of the present disclosure, the orientation terms used, such as "upper", "lower", "left", "right", etc., are used to indicate relative positional relationships to assist those skilled in the art in understanding the embodiments of the present disclosure. Therefore, it should be understood by those skilled in the art that "upper"/"lower" in one direction may become "lower"/"upper" in an opposite direction, and may become another positional relationship, such as "left"/"right" etc., in another direction.

Further, although the embodiments of the present disclosure are described in detail below by taking a cloud game as an example, the present disclosure is not limited thereto. In fact, the present disclosure may also be applied to other application scenarios comprising, but not limited to, remote surgery, remote manipulation of robots, drones, vehicles, etc. In other words, the solutions according to the embodiments of the present disclosure may be applied as long as there is a scenario in which a streaming media responsive to a local operation needs to be provided in real time.

As described above, due to the limitation of the hardware and application scenarios of the mobile terminals, it is difficult for users to enjoy satisfactory gaming experience anytime and anywhere. The running of large-scale games or high-quality games often relies on local hardware with a high processing capability such as desktop computers. The cloud game is not a game software which is run locally and consumes a lot of hardware resources (for example, a graphics processor, a memory, etc.), and instead, is a game software which is run by a remote server on the cloud, and a game picture generated after the game software is run is transmitted by the remote server to a local mobile terminal in real time. However, the cloud game has high requirements on the network, and WIFI and 4G networks may not fully meet requirements of the cloud game. Due to the emergence of 5G, it provides guarantee on a communication line with a low delay and a high bandwidth which has never been seen before, and therefore a mobile terminal which supports 5G may enable games to be run in real time in a streaming media manner, thus enabling users to have experience on games which require a high performance at a mobile terminal with a low power consumption and a low performance in a case where a 5G communication line with a low delay and a high bandwidth is supported.

However, as also described above, although the game may be played in this way, due to the limitation of sizes of the mobile terminals, the limited screen sizes still may not provide satisfactory gaming experience. In addition, even if a picture is projected onto a larger screen (of, for example, a local TV, projector, or other monitor) using, for example, a local screencast function of the mobile terminal, due to a significant delay (usually more than a half of a second) introduced by the screencast function, it may also cause users' gaming experience to deteriorate. In addition, when the game is run by the mobile terminal, it affects the use of other functions of the mobile terminal, such as making calls, and the use of other functions of the mobile terminal, such as receiving incoming calls, message notifications etc., also affects the running of the game. Further, when the game is run by the mobile terminal, it consumes a large amount of battery power, thus resulting in a decline in the endurance of the mobile terminal. The game is run and operated in a touch manner by the mobile terminal, and a more convenient controller such as a Bluetooth controller, may not be used. Operations such as login, authentication, etc. still need to be performed before the game is run by the mobile terminal.

According to some embodiments of the present disclosure, there is proposed a portable cloud game device which may be directly connected to a large screen. In some embodiments, the portable cloud game device may have a size similar to that of a USB flash drive or a television stick, and may be directly plugged into an interface of a display device such as USB or HDMI etc., and provide a cloud game service through a 5G network. In this way, a user may play a game by plugging the portable cloud game device into a large screen (of, for example, a television, a display, etc.) which may be seen everywhere, even during a business trip or a trip. In addition, since the portable cloud game device may be powered through a USB or HDMI interface, users and/or developers do not need to consider their power saving issues.

A cloud game device, or more generally, a device for streaming media interaction, according to an embodiment of the present disclosure will be described in detail below with reference to FIGS. 1 to 5. Hereinafter, "cloud game device" and "device for streaming media interaction" may be used interchangeably as synonyms unless otherwise specified.

FIG. 1 is a diagram illustrating an exemplary application scenario in which a device 120 for streaming media interaction (or cloud game device) and a system 100 comprising the device 120 for streaming media interaction may be applied according to an embodiment of the present disclosure. As shown in FIG. 1, the system 100 may primarily comprise the device 120 for streaming media interaction and a remote (game) server 160. In the embodiment shown in FIG. 1, the device 120 for streaming media interaction and the server 160 may communicate over, for example, a 5G communication link. The 5G communication link may comprise, for example, an access link 123 between the device 120 for streaming media interaction and a base station 140 and core network links between the base station 140 and a network 150 and between the network 150 and the server 160. However, it should be illustrated that the communication link between the device 120 for streaming media interaction and the server 160 is not limited thereto, and may be any communication link which supports end-to-end QoS and has a sufficient bandwidth and a low response time.

Moreover, in some embodiments, the device 120 for streaming media interaction may be communicatively connected to a display device 110. For example, in some embodiments, the device 120 for streaming media interaction may be plugged directly into an interface (for example, a USB interface, an HDMI interface, etc.) of the display device 110 without a cable and provide a game picture (or more generally, streaming media data) received from the server 160 to the display device 110.

Thus, in some embodiments, the device 120 for streaming media interaction may also be communicatively connected to the controller 130, which is manipulated by a user 135, through a communication link 125 to receive a control input (for example, an action to manipulate game characters, etc.) from the controller 130. In some embodiments, the communication link 125 may be a short range communication link as described below, which supports short range communication protocols such as Bluetooth, Wi-Fi, ZigBee, Z-Wave, etc.

With the system architecture shown in FIG. 1, the user 135 may manipulate, for example, game characters displayed on the display device 110 through the controller 130. Specifically, the user 135 may manipulate the controller 130, and the controller 130 may transmit control data corresponding to the manipulation of the user 135 to the device 120 for streaming media interaction through the short range communication link 125. The device 120 for streaming media interaction which receives the control data may provide the control data to the server 160 through the access link 123, the base station 140, the core network link 145, the network 150, and the core network link 155. Then, the server 160 may calculate, according to the received control data, a game application running thereon, and obtain a media stream responsive to the control data (comprising, for example, a game video, a game audio etc. generated by the game application in response to the control data). Then, the server 160 may transmit back the media stream responsive to the control data to the device 120 for streaming media interaction through the core network link 155, the network 150, the core network link 145, the base station 140, and the access link 123. Finally, the device 120 for streaming media interaction may provide a display picture and/or an audio signal to the display device 110 based on the received media stream, wherein the display picture and/or audio signal is responsive to the manipulation of the controller 130 by the user 135 in real time.

In some embodiments, the media stream generated by server 160 in response to the control data may be an encoded and/or encrypted media stream. For example, in a case where encoding is supported by the device 120 for streaming media interaction, the media stream may be a media stream encoded in any encoding manner, comprising, but not limited to, at least one of International Telecommunication Union (ITU)-T H.263, ITU-T H.264, Part 2 of Moving Picture Experts Group-2 (MPEG-2), Part 2 of Moving Picture Experts Group-4 (MPEG-4), High Efficiency Video Coding (HEVC), RealVideo RV 40, VP9 released by Google etc.

In addition, in some embodiments, when the media stream comprises an audio stream, the encoding manner of the audio stream may comprise, but not limited to, at least one of MP2, MP3, AAC, AC-3, ITU-T G.711/G.722/G.726, iLBC, Vorbis, FLAC, Opus, etc. Although the embodiment shown in FIG. 1 only illustrates the display device 110, when the media stream comprises an audio stream, the device 120 for streaming media interaction may output the audio stream to the display device 110 or another device (for example, a Bluetooth headset, a Wi-Fi stereo, etc.), to enable the display device 110 or the other device to play an audio which is synchronized with a picture of the video stream.

In addition, in some embodiments, the media stream transmitted from the server 160 to the device 120 for streaming media interaction may be encrypted as needed when encryption is supported by the device 120 for streaming media interaction. For example, when a drone is remotely manipulated, the media stream may be encrypted and decrypted at the device 120 for streaming media interaction in order to prevent a real-time picture transmitted back by the drone from being snooped by a third party.

Moreover, although in the embodiment shown in FIG. 1, the device 120 for streaming media interaction is shown as being directly plugged into the interface of the display device 110, the present disclosure is not limited thereto. In some other embodiments, the device 120 for streaming media interaction may be communicatively connected to the display device 110 through a cable (for example, a USB cable, an HDMI cable, etc.)

In addition, the device 120 for streaming media interaction may be indirectly connected to the display device 110 by being connected to an existing set top box, a smart television box, etc.

Further, although in FIG. 1, the communication connection between the controller 130 and the device 120 for streaming media interaction is shown as a wireless connection (for example, a Bluetooth connection), the present disclosure is not limited thereto. In some other embodiments, the controller 130 may also be connected to the device 120 for streaming media interaction through a wired connection, such as a USB cable having a micro USB interface, a serial cable, a parallel cable, etc. Further, although the controller 130 is illustrated in a form of a game pad in FIG. 1, the present disclosure is not limited thereto.

In some other embodiments, the controller 130 may be, for example, a smart phone, a tablet, a joystick, a mouse, a trackball, a touch pad, or even a touch screen of the display device 110, etc.

Further, in some embodiments, in order for the device 120 for streaming media interaction to access the communication network, a Subscriber Identity Module (SIM) card may be used thereon, for example, a standard SIM card, a micro SIM card, a NANO SIM card, or even an eSIM card as a virtual SIM card.

With the device 120 for streaming media interaction according to the embodiments of the present disclosure described above, at least the following advantages may be provided. Firstly, the device 120 for streaming media interaction may provide a larger display screen and better audio and video effects (for example, a higher resolution, a surround sound etc.) by being connected to, for example, a large-screen television which may be seen anywhere as compared with a mobile terminal (for example, a smart phone), which may provide a high-performance gaming experience using a limited amount of hardware resources. Further, the device 120 for streaming media interaction does not affect the use of other functions of the mobile terminal, and is not affected by the other functions of the mobile terminal. In addition, as described below in conjunction with FIG. 3, since the device 120 for streaming media interaction itself does not need to have a display screen, it is more portable than a mobile terminal, and has a size generally similar to that of a USB flash drive or a television stick, so that a user may conveniently carry it to various places. Secondly, the device 120 for streaming media interaction is connected to a device such as a television, which eliminates the need for consideration of a power issue of the device 120 by streaming media interaction itself, thereby making a user more free in playing a game as compared with a mobile terminal with limited power. Again, a progress of a cloud game etc. may be bound to the device 120 for streaming media interaction by using an identity recognition mechanism such as a SIM card etc., thereby enabling management of the cloud game, pause/resume of the cloud game, abnormality detection of the cloud game, etc. as described below in conjunction with FIG. 5. In addition, due to the use of a dedicated SIM card, as compared with a mobile terminal, the device 120 for streaming media interaction may also avoid the interruption of the progress of the game by unwanted calls etc. For example, a service provider/network operator etc. may implement a spam call/information shielding function simply by providing an internet card which is dedicated to the device 120 for streaming media interaction and may not make calls and/or transmit text messages. In addition, it is also convenient for an operator to perform directed charging on a data traffic of a dedicated SIM card by setting a special charging rule for the dedicated SIM card.

Next, how an end-to-end QoS mechanism in a 5G communication standard is applied to the device and/or system for streaming media interaction according to the embodiments of the present disclosure will be described in detail with reference to FIGS. 2A and 2B.

Figure 2A:
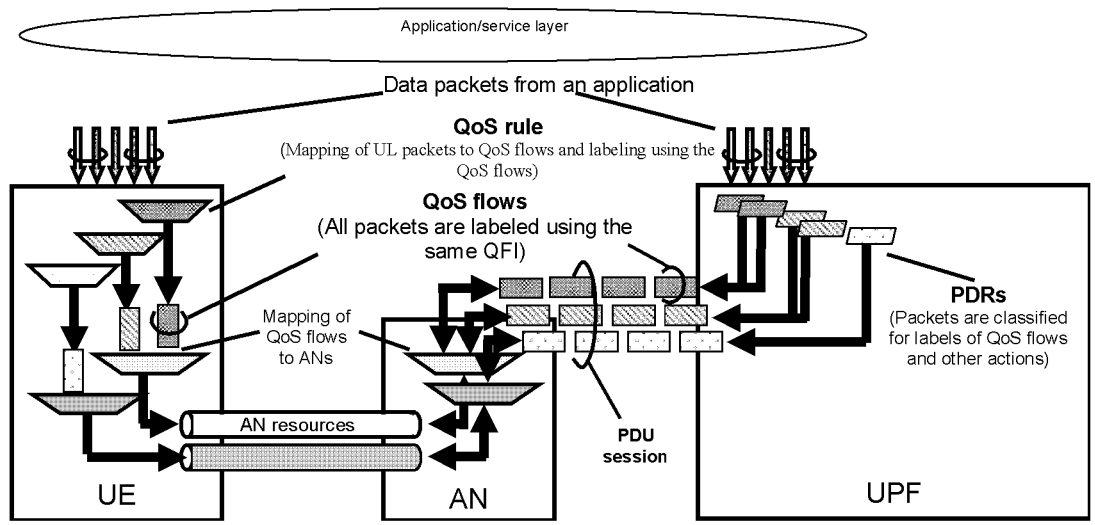
FIGS. 2A and 2B are diagrams illustrating exemplary architecture of a wireless communication network which supports Quality of Service (QoS) guarantee according to an embodiment of the present disclosure.
Figure 2B:
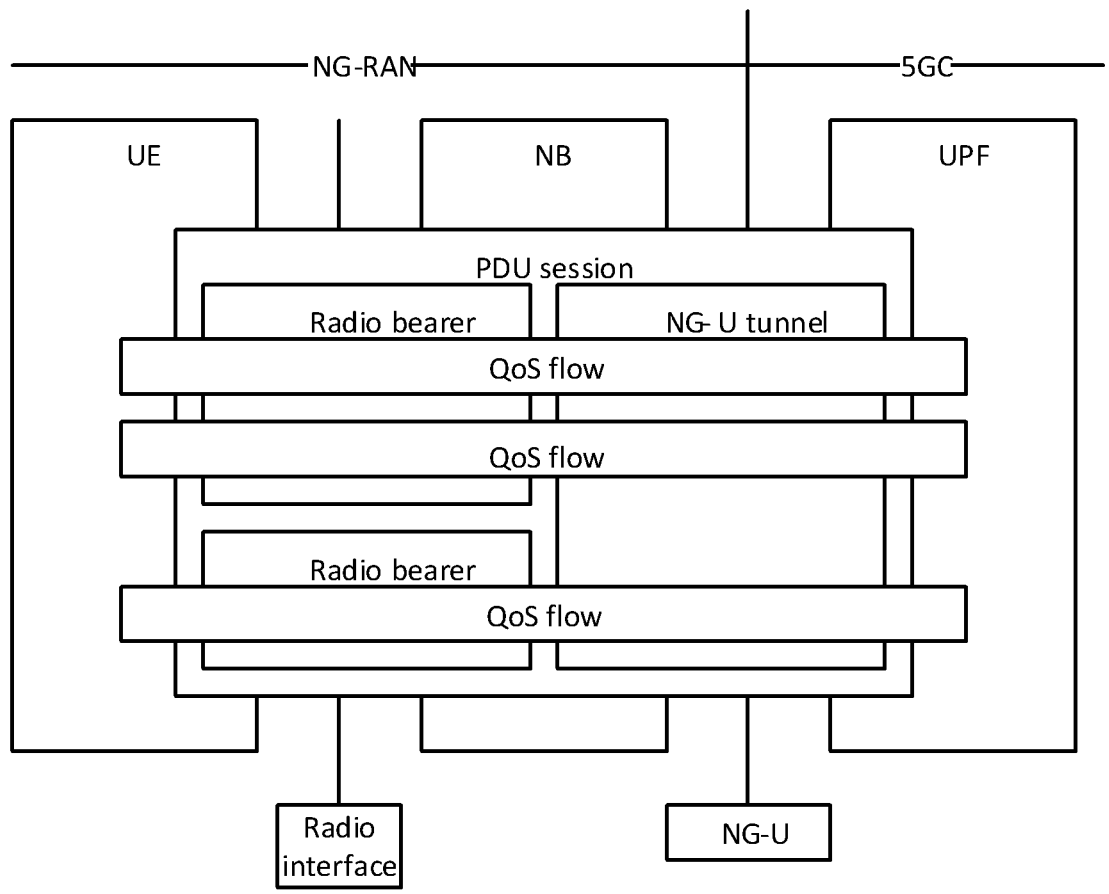

FIGS. 2A and 2B are diagrams illustrating exemplary architecture of a wireless communication network which supports Quality of Service (QoS) guarantee according to an embodiment of the present disclosure. Specifically, FIG. 2A illustrates a principle for classification and user plane labeling of QoS flows and mapping to Access Network (AN) resources. As described in 3GPP TS 23.501 V16.0.0 (which is incorporated herein by reference in its entirety), a 5G QoS model is based on QoS flows. The 5G QoS model supports both QoS flows (GBR QoS flows) which require a guaranteed bit rate and QoS flows (non-GBR QoS flows) which do not require a guaranteed bit rate. In 5G, the QoS flows are the finest QoS discrimination granularities in a Packet Data Unit (PDU) session. QoS Flow IDs (referred to as QFIs for short) are used to identify QoS flows in a 5G system. The same traffic forwarding process (for example, scheduling, admission threshold, etc.) is performed on user plane traffics with the same QFI in the PDU session. The QFI is encapsulated in an encapsulation header on N3 (and N9), i.e., no changes are made to an e2e packet header. In 5G, the QFI is used for all PDU session types. The QFI should be unique in the PDU session. The QFI may be dynamically allocated or may be equal to 5Q1.

As shown in FIG. 2A, an exemplary system may comprise, for example, a User Equipment (UE) on the left side, an Access Network (AN) in the middle, and a User Plane Function (UPF) on the right side. With reference to FIG. 1, the UE shown in FIG. 2A may be, for example, the device 120 for streaming media interaction shown in FIG. 1, the AN may be, for example, the base station 140 shown in FIG. 1 and related access network entities not shown in the figure (for example, a base station controller, a mobility management entity, etc.), and the UPF may be, for example, the server 160 shown in FIG. 1.

Returning to FIG. 2A, in terms of an uplink (UL), for a PDU session having an Internet Protocol (IP) type or an Ethernet type, the UE (or the device 120 for streaming media interaction) may evaluate a UL packet based on a UL packet filter in a set of packet filters in each of QoS rules, and specifically, evaluate the UL packet in an ascending order of priority values of the QoS rules, until a matching QoS rule is found (i.e., a packet filter thereof matches the UL packet). If no matching QoS rule is found, the UE discards the UL data packet. Further, for a PDU session having an unstructured type, a default QoS rule does not contain any set of packet filters and allows all UL packets.

Specifically, for the embodiment shown in FIG. 1, with reference to FIG. 2A, for a data packet (for example, control data received from the controller 130 through the Bluetooth link 125) issued by an application layer of the UE (for example, the device 120 for streaming media interaction), the UE transmits the data packet to a corresponding PDU session in a block on the left side of FIG. 2A, and prioritizes the data packet as well as other data packets issued by other applications or other data packets issued by the same application. It should be illustrated that although only one uplink PDU session and its three QoS flows having different priorities are shown in FIG. 2A, the present disclosure is not limited thereto. As shown in FIG. 2A, a QFI corresponding to a QoS flow having the highest priority may be allocated by the UE to all packets of the control data, that is, all packets of the control data are labeled with the QFI, may be transmitted to the AN through corresponding radio resources allocated by the AN, and then the QoS flow is transmitted between the AN and the UPF through the QFI by using link resources having corresponding priorities, thereby ensuring end-to-end QoS of the uplink data.

In terms of a downlink (DL), a UPF classifies packet data issued by an application layer of the UPF based on a set of packet filters of each of DL packet Detection Rules (PDRs), and specifically, classifies the packet data according to priorities of the DL PDRs. The UPF also classify user plane traffics belonging to the same QoS flow using QFIs. The AN then binds the QoS flow to AN resources. It should be illustrated that there is no strict one-to-one relationship between QoS flows and AN resources. The AN may decide which AN resources may be mapped to the QoS flows and decide how to release the AN resources. Further, if the UPF may not find a matching DL PDR, it should discard the DL data packet.

Specifically, for the embodiment shown in FIG. 1, for a data packet (for example, streaming media data generated by the server 160 in real time according to received control data) issued by an application layer of the UPF, the UPF may transmit the data packet to a corresponding PDU session in a block on the right side of FIG. 2A, and prioritizes the data packet as well as data packets issued by other applications or other data packets issued by the same application (for example, allocate these data packets to different QoS flows). It should be illustrated that although only one downlink PDU session and its three QoS flows having different priorities are shown in FIG. 2A, the present disclosure is not limited thereto. As shown in FIG. 2A, a QFI corresponding to a QoS flow having the highest priority may be allocated by the UPF to all packets of the streaming media data, that is, all packets of the streaming media data are labeled with the QFI, and may be transmitted to the UE through corresponding radio resources allocated by the AN, thereby ensuring end-to-end QoS of the downlink data.

More intuitively, the 5G end-to-end QoS guarantee from the perspective of the access network may be described in conjunction with FIG. 2B. Similarly to FIG. 2A, all the entities in FIG. 2B may also be equivalent to respective entities in FIG. 1 (an NB in FIG. 2B is a NodeB, i.e., a Node B or an access point, which is equivalent to an AN of FIG. 2A), and will not be described in detail here. Reference may be made herein to 3GPP TS 38.300 V15.4.0 (2018 December) (which is incorporated herein by reference in its entirety).

As shown in FIG. 2B, a 5G core network (5GC) establishes one or more PDU sessions for each UE. Further, a Next Generation (NG)-Radio Access Network (RAN) establishes at least one Data Radio Bearer (DRB) in a PDU session for each UE, and may then configure additional DRBs for one or more QoS flows of the PDU session (when to perform the above operation is determined by the NG-RAN). Packets belonging to different PDU sessions are mapped to different DRBs, and Non-Access Stratum (NAS) packet filters in the UE and the 5GC associate UL packets and DL packets with QoS flows respectively. UL QoS flows and DL QoS flows are associated with DRBs respectively using Access Stratum (AS) mapping rules in the UE and the NG-RAN. Specifically, reference may be made to the above detailed description in conjunction with FIG. 2A.

In this way, as shown in FIG. 2B, an end-to-end QoS flow between the UE (for example, the device 120 for streaming media interaction) and the UPF (for example, the server 160) may be established, thereby ensuring QoS characteristics such as a delay of packet data transmitted in the QoS flow, a bandwidth etc.

Next, a hardware structure and a hardware arrangement of the device for streaming media interaction according to the embodiments of the present disclosure will be described in detail with reference to FIGS. 3 and 4.

Figure 3:
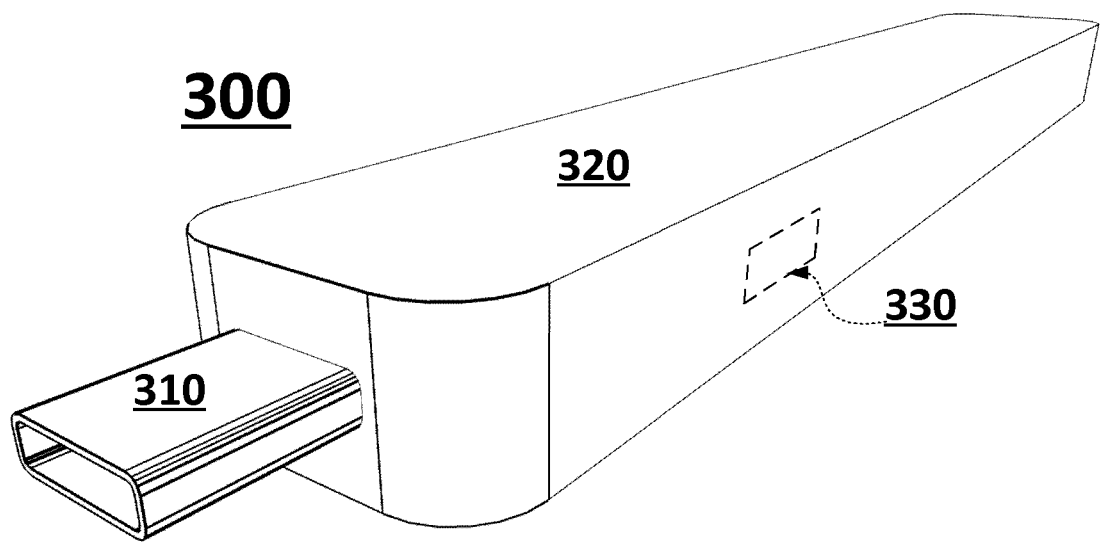
FIG. 3 is an exemplary perspective view illustrating a device for streaming media interaction according to an embodiment of the present disclosure.

FIG. 3 is an exemplary perspective view illustrating a device 300 for streaming media interaction according to an embodiment of the present disclosure. In some embodiments, the device 300 for streaming media interaction may be, for example, the device 120 for streaming media interaction shown in FIG. 1, or may be the UE shown in FIG. 2A and/or FIG. 2B.

As shown in FIG. 3, the device 300 for streaming media interaction may generally comprise a connector 310 and a body 320. In some embodiments, the body 320 may generally have a rectangular parallelepiped shape. Further, the rectangular parallelepiped may be, for example, a rounded rectangular parallelepiped to prevent sharp corners from being easily damaged or causing damage. For example, as shown in FIG. 3, an appearance of the device 300 for streaming media interaction may have a shape similar to that of a U disk or a television stick. However, it should be illustrated that a shape of the device 300 for streaming media interaction is not limited to the rectangular parallelepiped shape, but may be any shape suitable for being plugged into, for example, an interface of a television, comprising, but not limited to, a cube, a rectangular parallelepiped, a cylinder, a cone, a sphere, an ellipsoid, a triangular pyramid, a quadrangular pyramid, a frustum of a pyramid, a round table, or any other regular or irregular shape.

In some embodiments, the body 320 may have a length less than or equal to 18 cm, a width less than or equal to 7 cm, and a thickness less than or equal to 4 cm. In some other embodiments, the body 320 may have a length less than or equal to 13 cm, a width less than or equal to 2 cm, and a thickness less than or equal to 1 cm. The device 300 for streaming media interaction having this size is significantly smaller than the mobile terminal, and thereby may provide better portability. However, it should be illustrated that the present disclosure is not limited thereto. As described above, the body 320 may have any desired size and/or size.

Further, in some embodiments, the connector 310 may be a connector 310 which conforms to any interface specification. Although in the embodiment shown in FIG. 3, the connector 310 is shown as a connector which conforms to a USB Type C specification, the present disclosure is not limited thereto. In some other embodiments, the connector 310 may conform to specifications comprising, but not limited to, at least one of USB Type A/B/C, micro USB, Video Graphics Array (VGA), Digital Video Interface (DVI), High Definition Multimedia Interface (HDMI) 1.4/2.0/2.0a/2.0b, or any other interface for audio and video transmission etc. The device 300 for streaming media interaction may be plugged into a display (for example, the display device 110 shown in FIG. 1) through the connector 310 and output a corresponding video signal to the display.

Further, in a case where a USB series interface, for example, is used, since the USB interface may provide sufficient supply current, there is no need to provide a power supply or a power supply interface on the device 300 for streaming media interaction. However, in a case where an HDMI series interface, for example, is used, since current provided through the HDMI interface is small, it is generally impossible to drive various hardware modules on the device 300 for streaming media interaction, and therefore an optional external power supply interface 330 may be provided for convenience of providing power to the device 300 for streaming media interaction through the power supply interface 330. In addition, whether or not the power supply interface 330 is provided may be selected as needed (for example, some components on the device 300 for streaming media interaction require large current or high voltages) instead of depending on interface types. Further, in some cases, a built-in battery may also be provided in the device 300 for streaming media interaction.

Next, an internal hardware arrangement of the device for streaming media interaction will be described in detail in conjunction with FIG. 4. FIG. 4 is a diagram illustrating an exemplary hardware arrangement of a device 400 for streaming media interaction according to an embodiment of the present disclosure. As shown in FIG. 4, the device 400 for streaming media interaction may comprise a processor 410, a short range communication module 420, a wireless communication module 430, a memory 440, a decoder 450, and/or a streaming media output interface 460. It should be illustrated that the embodiments of the present disclosure are not limited thereto, and may, for example, have other additional components, do not have some of the components described above, or may have substitution components having the same or similar functions. For example, in some embodiments, the decoder 450 may be an integrated component of the processor 410, for example, may be one processor core of the processor 410, or may be stored in the memory 440 in a form of a software decoder. As another example, in some other embodiments, the streaming media output interface 460 may be hardwired wires which are drawn from certain pins of the processor 410. As another example, in a case where the processor 410 is, for example, a System-On-Chip (SoC), the modules/interfaces described above may be integrated into a single chip without separate individual modules.

Figure 4:
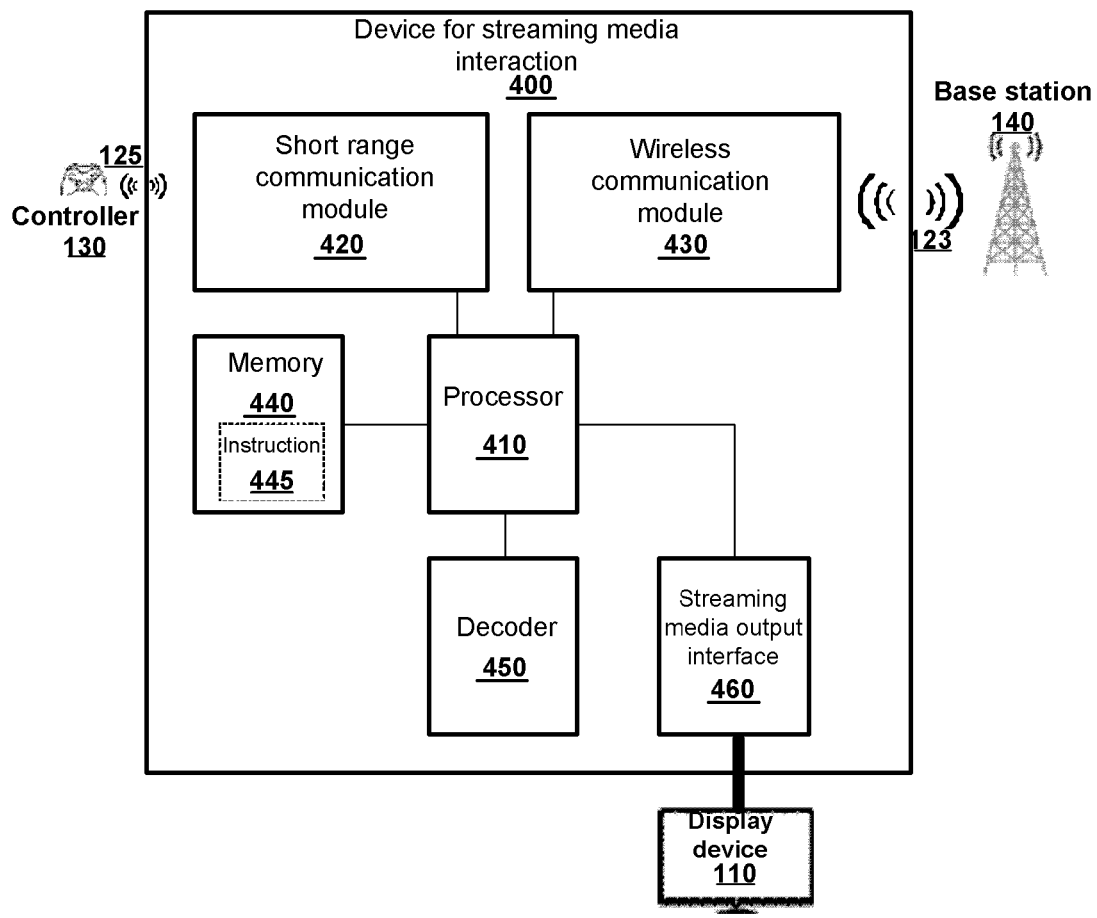
FIG. 4 is a diagram illustrating an exemplary hardware arrangement of a device for streaming media interaction according to an embodiment of the present disclosure.

In the embodiment shown in FIG. 4, the short range communication module 420 may be, for example, a module which supports short range communication, for example, at least one of a Bluetooth communication module, a WiFi communication module, a ZigBee communication module, a Z-Wave communication module etc. The short range communication module 420 may enable the device 400 for streaming media interaction to communicate with the controller 130 through the short range communication link 125 and may receive control data from the controller 130 and/or provide feedback (for example, a control data reception response etc.) to the controller 130. However, it should be illustrated that as described above, the controller 130 may also be connected to the short range communication module 420 in, for example, a wired manner, for example, through a USB cable, an HDMI cable, an IEEE 1394 cable, a serial cable, a parallel cable etc. In this case, the short range communication module 420 may also be a corresponding wired communication module.

In the embodiment shown in FIG. 4, the wireless communication module 430 may be a module which is used for wireless communication with the base station 140 (and thus with the server 160 shown in FIG. 1) through the wireless link 123. In some embodiments, the wireless communication module 430 may be configured to support a wireless communication protocol which implements end-to-end Quality Of Service (QoS) guarantee, such as a 3GPP 5G NR (i.e., New Radio) communication protocol or subsequent wireless communication protocols thereof. As described above in conjunction with FIGS. 1, 2A and 2B, the device 400 for streaming media interaction may communicate with the remote server 160 through the wireless communication module 430. For example, control data received by the device 400 for streaming media interaction from the controller 130 is transmitted to the remote server 160, and a media stream generated in real time in response to the control data is received from the remote server 160. In some embodiments, the QoS-related standard in the 5G NR protocol stipulates that a delay of the communication network is less than 1 millisecond, and thus a delay from a time when the control data is transmitted from the device 400 for streaming media interaction to the remote server 160 to a time when the device 400 for streaming media interaction receives a corresponding media stream from the remote server 160 is less than 50 milliseconds, and in some embodiments, even less than 20 milliseconds. In this way, a user may basically not feel any delay since a period between a time when he/she transmits a control operation and a time when he/she sees a response on a television is within 50 milliseconds (or 20 milliseconds), and thereby may obtain very smooth gaming experience.

In the embodiment shown in FIG. 4, if a streaming media received by the device 400 for streaming media interaction is an encoded streaming media, the decoder 450 may correspondingly decode the encoded streaming media under control of the processor 410, and return the decoded media stream to the processor 410. Further, in some other embodiments, the decoder 450 may also directly output the decoded media stream through the streaming media output interface 460 without outputting the decoded media stream output through the processor 410 as shown in FIG. 4.

In the embodiment shown in FIG. 4, the streaming media output interface 460 may be used to output a video stream and/or an audio stream in the media stream to an external apparatus (for example, the display device 110) under control of the processor 410 (or the decoder 450). In some embodiments, the streaming media output interface 460 may be the USB interface, the HDMI interface, etc. as described above. Further, in a case where, for example, the device 400 for streaming media interaction is communicably connected to an external display device and an audio device respectively, the video stream and the audio stream in the media stream may be output to the external display device and the audio device respectively. For example, the video stream is output to the display device 110 through the streaming media output interface 460, and the audio stream is output to an external headphone or speaker through the short range communication module 420. In addition, the device 400 for streaming media interaction may also be powered through the streaming media output interface 460, so that the device 400 for streaming media interaction does not need to have any built-in power supply (for example, battery).

In the embodiment shown in FIG. 4, the memory 440 may be communicatively connected to the processor 410. In some embodiments, the memory 440 may be an individual hardware module separate from the processor 410 or a built-in memory integrated in the processor 410. The memory 440 may have stored therein instructions (for example, computer executable instructions, program codes etc.) which, when read and executed by the processor 410, may cause the processor 410 to perform various operations which are described above in conjunction with FIGS. 1, 2A and 2B and described below in conjunction with FIG. 5. In some embodiments, the memory 440 may comprise, but not limited to, a Read Only Memory (ROM), a Random Access Programmable Read Only Memory (PROM), an Electrically Erasable Programmable Read Only Memory (EEPROM), a Random Access Memory (RAM), a Dynamic Random Access Memory (DRAM), a Static Random Access Memory (SRAM), a flash memory, a non-volatile memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-RE, a Blu-ray or optical disc memory, a Hard Disk Drive (HDD), a Solid State Drive (SSD), a flash memory, a card type memory (for example, a multimedia card, a Secure Digital (SD) card or an eXtreme Digital (XD) card), a magnetic tape, a floppy disk, a magneto-optical data storage device, an optical data storage device, a hard disk, a solid state disk, etc.

Further, although a component connection manner centered on the processor 410 is illustrated in FIG. 4, the present disclosure is not limited thereto. In fact, various components comprising the processor 410 may also be connected in, for example, a bus manner, for example, all components are connected to a data bus, an address bus, a clock bus etc. for time division operations etc. In other words, FIG. 4 only illustrates one specific manner in which the device for streaming media interaction according to the embodiment of the present disclosure is implemented, and is not exhaustive to the embodiment of the present disclosure, and therefore the present disclosure is not limited to the hardware arrangement manner of the device for streaming media interaction shown in FIG. 4.

Figure 5:
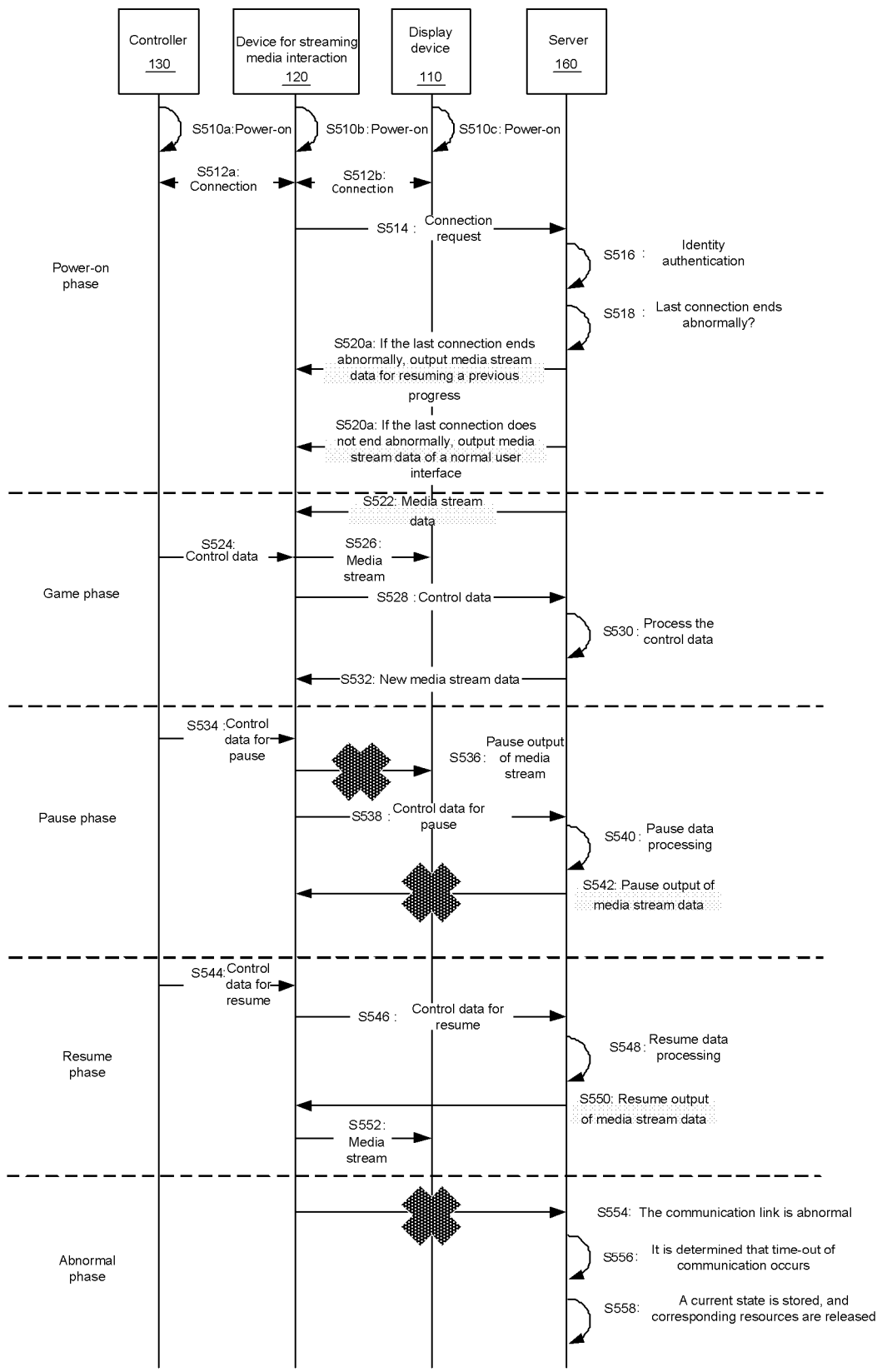
FIG. 5 is a diagram illustrating exemplary message exchange among a device for streaming media interaction, associated devices thereof and a remote server according to an embodiment of the present disclosure.

Hereinafter, a workflow of the system for streaming media interaction according to the embodiment of the present disclosure will be described in detail with reference to FIG. 5. FIG. 5 is a diagram illustrating exemplary message exchange among a device for streaming media interaction (for example, the device 120 for streaming media interaction), associated devices thereof (for example, the display device 110, the controller 130 etc.) and a remote server (for example, the server 160) according to an embodiment of the present disclosure. As shown in FIG. 5, the device 120 for streaming media interaction may operate in various different phases; however, it should be illustrated that there are no obvious boundaries between the respective phases. In other words, the device 120 for streaming media interaction may operate in multiple phases at the same time, for example, may operate in a game phase and an abnormal phase at the same time, may operate in a pause phase and the abnormal phase at the same time etc. Therefore, it should be understood by those skilled in the art that the embodiments of the present disclosure are not limited to the division and order of these phases, which may be combined, deleted or modified in any suitable manner as needed. Moreover, although only one device 120 for streaming media interaction is shown in FIG. 5, the present disclosure is not limited thereto, and any number of devices 120 for streaming media interaction may be used. For example, for the same server 160, as long as support in terms of hardware/software resources is satisfied, the server 160 may support multiple devices 120 for streaming media interaction to operate at the same time, and these phases may be performed separately for each device 120 for streaming media interaction. Further, although the following description is made in order, an actual workflow does not necessarily occur in the following order, but may occur in a different order or at the same time.

As shown in FIG. 5, in a power-on phase, in steps S510a, S510b, and S510c, the controller 130, the device 120 for streaming media interaction, and the display device 110 are powered on respectively. It should be illustrated that although the power-on of the three devices are shown as occurring substantially at the same time, in practice the power-on of the three devices may occur in a certain order without necessarily occurring at the same time. After the power-on, the controller 130 and the display device 110 may be communicatively connected to the device 120 for streaming media interaction in steps S512a and S512b respectively, to enable the device 120 for streaming media interaction to receive control data from the controller 130 and output a video stream and/or an audio stream to the display device 110. Similarly, an actual order in which steps S512a and S512b are performed is also not limited by the order shown in FIG. 5.

Next, in step S514, the device 120 for streaming media interaction may transmit a connection request to the server 160. In some embodiments, the connection request may comprise an identifier indicating an identity of the device 120 for streaming media interaction and/or an associated authentication credential (for example, an International Mobile Subscriber Identity (IMSI) of an SIM card, a username, a password, etc.) for the server 160 to authenticate the connection request. After receiving the connection request, in step S516, the server 160 may authenticate the connection request based on, for example, authentication information which is stored in the server 160 and is associated with the device 120 for streaming media interaction. Moreover, if the authentication fails, the server 160 may directly reject the connection request from the device 120 for streaming media interaction (for example, return a connection response indicating the rejection of the connection request to the device 120 for streaming media interaction) without providing any service. It should be illustrated that this authentication process is not necessary. For example, in some embodiments, a next step may be performed directly without performing authentication on the device 120 for streaming media interaction. In some embodiments, step S514 may be performed automatically in response to the device 120 for streaming media interaction being powered on or the device 120 for streaming media interaction being connected to the display device 110.

In step S518, after receiving an authentication request from the device 120 for streaming media interaction, the server 160 may determine whether a last connection of the device 120 for streaming media interaction abnormally ends according to stored data associated with the device 120 for streaming media interaction (specific description thereof may be known with reference to an abnormal phase below). For example, if the server 160 finds that the last connection of the device 120 for streaming media interaction abnormally ends by reading a record, in step S520a, the server 160 may read stored last application execution data (for example, a progress of a game or other related information) and generate corresponding media stream data, to output the media stream data to the device 120 for streaming media interaction for resuming the previous progress of the game. If the server 160 finds that the last connection of the device 120 for streaming media interaction normally ends by reading the record, in step S520b, the server 160 may generate media stream data corresponding to, for example, a login main interface, to output media stream data of a normal user interface to the device 120 for streaming media interaction. Then, operations in subsequent other phases may be performed.

In a game phase, in step S522, the device 120 for streaming media interaction may continuously receive media stream data (for example, pictures of the game and/or sound of the game) from the server 160. The user may then respond to the pictures of the game and/or the sound of the game by, for example, correspondingly manipulating game characters through the controller 130, to transmit control data to the device 120 for streaming media interaction through the controller 130 in step S524. At substantially the same time as the responding operation or before the responding operation or after the responding operation, in step S526, the device 120 for streaming media interaction may process the media stream data received in step S522 and transmit the processed (for example, decoded, decrypted, etc.) media stream or an unprocessed media stream to the display device 110 for the display device 110 to display the pictures and/or for other devices (for example, an audio device) to output the sound.

In step S528, the device 120 for streaming media interaction may process the control data received in step S524 (for example, map a key to corresponding action data of a game character, etc.) or does not process the control data and transmit the processed or unprocessed control data to the server 160. After receiving the control data, the server 160 may interact with a game application which is executed currently based on the control data (for example, calculate pictures of the game and/or sound of the game responsive to the control data) and generate a corresponding media stream (for example, a video stream of the pictures of the game and/or an audio stream of the sound of the game) in step S530, and transmit the corresponding media stream to the device 120 for streaming media interaction in step S532.

In addition, in some cases, the user may actively or passively want to pause the game. In a pause phase, in step S534, the user may input control data for instructing to pause the game to the device 120 for streaming media interaction through, for example, the controller 130 (by, for example, pressing a particular key on the controller 130 or in response to not receiving control data from the controller 130 within a specified time period). The device 120 for streaming media interaction which receives the control data for pause may pause the output of the media stream to the display device 110 in step S536. For example, the same pause picture (for example, words "the game is paused" are presented on a black picture) may be continuously output to the display device 110, or output of any video signal may be directly stopped. At substantially the same time as the pausing operation or before the pausing operation or after the pausing operation, the device 120 for streaming media interaction may transmit control data for instructing to pause the game to the server 160. After receiving the control data for pause, in step S540, the server 160 may pause any data processing associated with the device 120 for streaming media interaction (for example, execution of the game application, generation of the media stream, the transmission of the media stream, etc.) to save computing resources (for example, processor cycles, memory footprint etc.) Therefore, in step S542, the server 160 may pause the output of the media stream to the device 120 for streaming media interaction to save network resources.

Further, the user may want to resume the game in a pause state. Thus, in a resume phase, in step S544, the user may input control data for instructing to resume the game to the device 120 for streaming media interaction through, for example, the controller 130 (by, for example, pressing the same or another particular key on the controller 130). In step S546, the device 120 for streaming media interaction which receives the control data for resume may transmit control data for instructing to resume the game to the server 160. After receiving the control data for resume, in step S548, the server 160 may resume any data processing associated with the device 120 for streaming media interaction (for example, the execution of the game application, the generation of the media stream, the transmission of the media stream, etc.) Therefore, in step S550, the server 160 may resume the output of the media stream to the device 120 for streaming media interaction. In step S552, the device 120 for streaming media interaction which receives new media stream data may output the received media stream (which has been processed or has not been processed) to the display device 110.

In addition, in addition to the case where the user actively or passively issues the control data for pause/resume as described above, there may be an abnormal case where the device 120 for streaming media interaction may not communicate with the server 160 due to, for example, power-off (for example, power-off of the device 120 for streaming media interaction), network degradation, etc. Therefore, in an abnormal phase, the server 160 may monitor abnormality of the communication link in step S554. For example, in some embodiments, a heartbeat signal may be transmitted periodically (for example, at intervals of 1 second, 2 seconds, 5 seconds, etc.) between the server 160 and the device 120 for streaming media interaction to ensure that the server 160 may determine that the device 120 for streaming media interaction is abnormal in a case of time-out of the communication. If the server 160 determines, in step S556, that time-out of the communication with the device 120 for streaming media interaction occurs (for example, no heartbeat signal is received within a specified time period, or no control data is received from the device for streaming media interaction within a specified time period etc. as described above), in step S558, the server 160 may store application execution data (for example, a progress of the game, resource allocation, etc.) associated with the device 120 for streaming media interaction and release associated resource usage (for example, a processor, a memory, etc.) Thus, the progress of the game which abnormally ends may be resumed when the device 120 for streaming media interaction is connected to the server 160 again, for example, in the power-on phase described above.

With the device 120 for streaming media interaction and the system for streaming media interaction according to the embodiments of the present disclosure described above, a user may be provided with streaming media interactive experience with a beautiful picture and a real-time response while avoiding the requirements for a bulky and non-portable desktop computer and installation and/or setup of corresponding software, and a previous progress of a game may be resumed anytime and anywhere, so that the user may enjoy the ultimate gaming experience more conveniently and quickly.

The present disclosure has been described in conjunction with the preferred embodiments hereto. It should be understood that various other changes, substitutions and additions may be made by those skilled in the art without departing from the spirit and scope of the present disclosure. Therefore, the scope of the present disclosure is not limited to the specific embodiments described above, but is defined by the appended claims.

In addition, functions described herein as being implemented by pure hardware, pure software, and/or firmware may also be implemented by dedicated hardware, a combination of general-purpose hardware and software, etc. For example, functions described as being implemented by dedicated hardware (for example, a Field Programmable Gate Array (FPGA), an Application Specific Integrated Circuit (ASIC), etc.) may be implemented by a combination of general-purpose hardware (for example, a Central Processing Unit (CPU), a Digital Signal Processor (DSP) etc.) and software, and vice versa.

The invention claimed is:

1. A device for streaming media interaction, the device comprising:
 a short range communication module;
 a wireless communication module configured to be capable of communicating with a remote server;
 a processor communicatively connected to the short range communication module and the wireless communication module;
 a memory having stored therein instructions which, when executed by the processor, enable the processor to:
  transmit, through the wireless communication module, one or more packets of control data, wherein the device received the control data through the short range communication module;

receive a media stream responsive to the control data through the wireless communication module; and output the media stream to an external apparatus, wherein the device is configured to:

evaluate said one or more packets of the control data based on an uplink packet filter in a set of packet filters in each of QoS rules;

based on the evaluation, determine whether there is a packet filter matching said one or more packets; and allocate an identifier corresponding to a quality of service (QoS) flow having a certain priority to said one or more packets of control data, and said one or more packets of the control data is transmitted by the device based on a result of the determination.

2. The device according to claim 1, wherein the wireless communication module is configured to support a wireless communication protocol which implements end-to-end Quality of Service (QoS) guarantee.

3. The device according to claim 1, wherein the wireless communication module is a communication module which supports 5th Generation (5G) wireless communication protocol or subsequent wireless communication protocols released by a 3rd Generation Partnership Project (3GPP) organization.

4. The device according to claim 1, wherein the received media stream is an encoded media stream, and the device further comprises a decoder communicatively connected to the processor, the instructions, when executed by the processor, further enable the processor to:

instruct the decoder to decode the encoded media stream; and output the decoded media stream to the external apparatus.

5. The device according to claim 1, further comprising:

a media stream output interface communicatively connected to the processor and configured to be able to output a video stream in the media stream to the external apparatus under control of the processor.

6. The device according to claim 5, wherein the instructions, when executed by the processor, further enable the processor to:

output an audio stream in the media stream to an external audio apparatus through the media stream output interface and/or the short range communication module.

7. The device according to claim 5, wherein the media stream output interface is a High Definition Multimedia Interface (HDMI) or a Universal Serial Bus (USB) interface, and/or wherein the device is powered through the media stream output interface.

8. The device according to claim 1, wherein the device has a length less than or equal to 18 cm, a width less than or equal to 7 cm, and a thickness less than or equal to 4 cm, and/or wherein the short range communication module is at least one of a Bluetooth communication module, a WiFi communication module, a ZigBee communication module, and a Z-Wave communication module.

9. The device according to claim 1, wherein the instructions, when executed by the processor, further enable the processor to:

determine whether no control input is received through the short range communication module within a predetermined time period; and in response to determining that no control input is received through the short range communication mod-ule within the predetermined period of time, transmit an instruction for instructing to pause the media stream through the wireless communication module.

10. The device according to claim 9, wherein the instructions, when executed by the processor, further enable the processor to:

output data indicating that the media stream is paused to the external apparatus.

11. The device according to claim 10, wherein the instructions, when executed by the processor, further enable the processor to:

output data indicating that the media stream is resumed to the external apparatus.

12. The device according to claim 9, wherein the instructions, when executed by the processor, further enable the processor to:

receive, through the short range communication module, a control input for instructing to resume the media stream in a state in which the receiving of the media stream is paused; and transmit an instruction for instructing to resume the media stream through the wireless communication module.

13. The device according to claim 1, wherein the instructions, when executed by the processor, further enable the processor to:

transmit an authentication message for authenticating the device through the wireless communication module; and receive an authentication result responsive to the authentication message through the wireless communication module.

14. The device according to claim 1, wherein the device comprises a SIM card having an identifier, and the media interaction is associated with the identifier of the SIM card.

15. A system for streaming media interaction, the system comprising:

a device for streaming media interaction, the device comprising:

a short range communication module;

a wireless communication module configured to be capable of communicating with a remote server;

a processor communicatively connected to the short range communication module and the wireless communication module;

a memory having stored therein instructions which, when executed by the processor, enable the processor to:

transmit, through the wireless communication module, one or more packets of control data, wherein the device received the control data through the short range communication module;

receive a media stream responsive to the control data through the wireless communication module; and output the media stream to an external apparatus, wherein the device is configured to:

evaluate said one or more packets of the control data based on an uplink packet filter in a set of packet filters in each of QoS rules based on the evaluation, determine whether there is a packet filter matching said one or more packets, wherein said one or more packets of the control data is transmitted by the device based on a result of the determination; and allocate an identifier corresponding to a quality of service (QoS) flow having a certain priority to said one or more packets of control data; and a server communicatively connected to the device and configured to:
receive a control input from the device;
generate a media stream based on the control input and a first application which is executed in association with the device; and
transmit the generated media stream to the device.

16. The system according to claim 15, wherein the server is further configured to:
detect a connection state of a communication link with the device;
store application execution data associated with the device in response to detecting that no data is received from the device within a predetermined time period; and
release resources allocated to the device.

17. The system according to claim 16, wherein the server is further configured to:
receive a connection request from the device;
determine whether last execution of application associated with the device ends normally;
read application execution data associated with the device which is stored previously in response to determining that the last execution of application associated with the device ends abnormally;
resume the generation of the media stream based on the application execution data; and
transmit the generated media stream to the device.

18. The system according to claim 15, wherein the device comprises a SIM card associated with an identifier, the media interaction is associated with the identifier of the SIM card.

\* \* \* \* \*